Jan. 25, 1944. J. C. McMULLEN 2,340,194
REFRACTORY OR INSULATING MATERIAL
Filed Nov. 14, 1941

HOLLOW GLOBULES OF ALUMINA

INVENTOR
John Charles McMullen
BY
R C Benner
ATTORNEY

Patented Jan. 25, 1944

2,340,194

UNITED STATES PATENT OFFICE 2,340,194

REFRACTORY OR INSULATING MATERIAL

John Charles McMullen, Niagara Falls, N. Y., assignor to The Carborundum Company, Niagara Falls, N. Y., a corporation of Delaware Application November 14, 1941, Serial No. 419,056

16 Claims. (Cl. 106—40)

This application relates to insulating refractories. The object of the invention is the improvement of such insulating refractories and of the hollow globules for the production thereof and for other purposes.

It has been known that relatively pure oxides, such as alumina, could be formed into hollow bubbles by melting these oxides and pouring a stream of such molten material past an air or steam jet. Such bubbles are difficult to use satisfactorily, however, because of the extreme fragility of the thin walled bubbles. When such bubbles are mixed with clay or other bonding materials, the blades of the mixing apparatus crush the bubbles to fragmentary bits, which have little or no included air space and which, therefore, have a seriously lowered insulating value. Further crushing also occurs in the pressing operation by which bricks are formed.

It has now been discovered that alumina bubbles, having strong thick walls, which overcome the above difficulties, can be made by a choice of the proper raw material and manner of treatment so that the bubbles after being blown contain substantial amounts of other substances beside the aluminum oxide. These other substances comprise titania, silica, and iron oxide, the titania being present in greater amounts than the silica or iron oxide.

Such bubbles can be mixed with bonding material and pressed without damage. The brick made from them, therefore, has a high percentage of substantially closed bubbles and accordingly a large amount of included air, which renders the brick highly heat insulating.

The invention is carried out by fusing the raw material in a suitable furnace, which may be an electric arc furnace of the type well-known in the manufacture of fused aluminous abrasives. The material is melted in such furnace, and reduction of oxides of iron, silicon, titanium, and other included metals is carried out to such extent that the titanium oxide content of the finished product lies between 1 and 1½%, and the iron oxide and silica content is also reduced. The reduced metals sink to the bottom of the melt, After entrapped gas resulting from oxidation of electrode carbons or from any other source is allowed to escape, the molten alumina with the desired amount of unreduced metal oxides, is caused to flow from the furnace in a thin stream. This stream is subjected to a powerful blast of air, steam, or other suitable gas directed at approximately right angles to it. The gas jet breaks the molten stream into droplets and carries them for several feet before dropping them into a suitable catching device. Since the droplets solidify before striking, they thus have a roughly spherical form, and have a hollow interior. Such solidified hollow globules are called bubbles. The size of the bubbles produced when a given velocity of impinging gas is employed varies considerably. In general, however, the higher the velocity of the blast the smaller the bubbles.

The invention will be more readily understood by reference to the accompanying drawing, in which.

Figure 1:
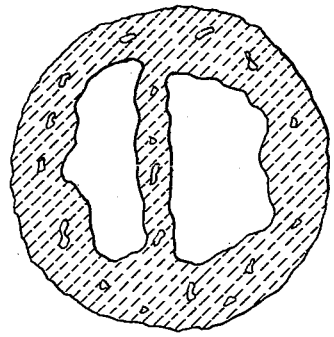
Fig. 1 is a cross-section through the equator of a bubble of the present invention.
Figure 2:
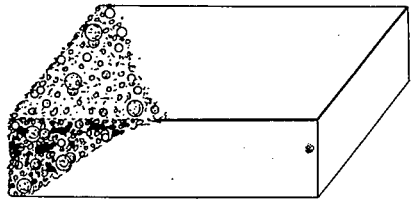
Fig. 2 is a view of a brick made of alumina bubbles of the kind shown in Fig. 1.

As will be noted in Fig. 1, the alumina bubble of the present invention has relatively thick side walls, solid in some portions and cellular in others. Furthermore, between ½ and ⅔ of the bubbles have their large inner cell or space divided by one or more partitions, as compared to ⅓ or less of such bubbles so divided when made of pure alumina. The side walls of the bubbles of the present invention are on the average relatively much heavier, from ⅓ to ½ thicker, than the side walls of the bubbles of comparable diameter produced by blowing relatively pure molten alumina in the same manner. As a result of the heavier side walls, and also of the multicellular formation, the bubbles are much more resistant to crushing. As a result, when mixed with a bonding material such as clay to make a refractory article, such as the brick shown in Fig. 2, pressing the resulting mixture to shape, drying and baking, the product will contain a large percentage of "substantially closed" hollow globules. By such expression is meant that such hollow globules are complete enough to remain filled with air during mixing, drying, and baking of the refractory brick or similar product. In general, the product has from 45–70% of the bubbles contained therein which are substantially closed. In a typical product the bubbles employed are chosen 6 mesh and finer.

Figure 3:
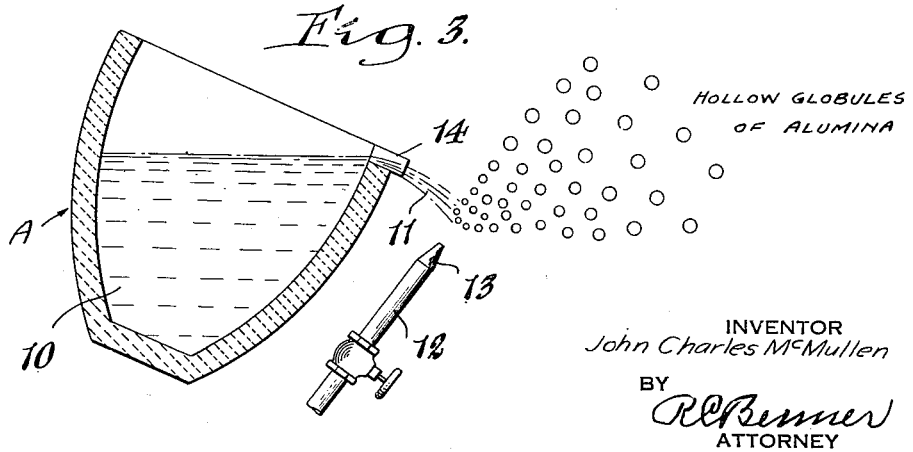
Fig. 3 shows schematically the process in which the alumina bubbles are formed from the melted material.

Fig. 3 shows a furnace A containing the molten material 10, of alumina with reducible impurities therein tilted so that a thin stream 12 thereof runs out at the pouring lip 14. Pipe 12 conducts gas under pressure to nozzle 13 from which it impinges on stream 11, with the result that the material is blown into the small hollow droplets shown. The furnace A is equipped with carbon electrodes, not shown, which reach down into the melt during its preparation and which are raised out of the way when the furnace is tilted to pour the melt as shown in Fig. 3.

As a starting material the substance known as "K5 Aloxite fines" may be used. This is very finely divided material which analyses as follows:

| | |
|---|---|
| $Al_2O_3$ per cent by weight | 96.06 |
| $SiO_2$ do | 0.76 |
| $FeO(Fe_2O_3)$ do | 0.60 |
| CaO | trace |
| MgO | trace |
| Alk. | |
| $TiO_2$ per cent by weight | 2.17 |

Comminuted material having approximately this analysis, obtained from any source, is obviously suitable. To this material is added ¼% by weight of petroleum coke. The mixture is fused in the furnace at approximately 1900° C. for a sufficient length of time; from 10–30 minutes, to reduce the metal oxides in the desired degree.

Representative bubbles which result from blowing air against the effluent stream of such partially purified alumina, have the following analysis:

| | |
|---|---|
| Ignitable matter per cent by weight | 0.15 |
| $Al_2O_3$ do | 98.33 |
| $SiO_2$ do | 0.29 |
| $FeO(Fe_2O_3)$ do | 0.16 |
| CaO | |
| MgO | |
| Alk. | |
| $TiO_2$ per cent by weight | 1.07 |

Within the scope of the invention, however, the titania in the bubbles may range from 1.0 to 1.5%, the iron oxide from 0.10 to 0.20%, and the silica from 0.25 to 0.35%.

The bubbles are scalped through a screen, either 6 or 8 mesh, and those failing to pass through are rejected. Screen analysis of a representative lot of the 8 mesh and finer bubbles showed approximately 70% on 40 mesh, 20% on 100 mesh and 10% through 100 mesh. Approximately 60% of the 8 mesh and finer were substantially fully enclosed globules.

Many different bonding materials may obviously be used, and the proportions of the alumina bubbles and bonding materials may vary. The examples given below are merely by way of illustration. In all the examples the alumina bubbles used are those resulting from the process of the present invention. All parts given are by weight.

Example No. 1

A mixture made up of the following components was employed:

| | Parts |
|---|---|
| Alumina bubbles (8 mesh and finer) | 75 |
| Georgia kaolin | 25 |
| Dry lignone | 2 |
| Water | 7 |

The mixture was pressed to shape, dried, and baked. Alternatively the shape may be slip cast, in which case the lignone is omitted.

Example No. 2

A mixture of the following components was used:

| | Parts |
|---|---|
| Alumina bubbles (6 mesh and finer) | 50 |
| #9 Vanderbilt kaolin | 40 |
| Tennessee ball clay | 10 |
| Dry lignone | 2 |
| Water | 7 |

As above, in Example 1, the mixture was pressed to shape, dried and baked. The lignone is omitted if the shape is slip cast instead of pressed.

Example No. 3

A mixture of the following components was employed:

| | |
|---|---|
| Alumina bubbles parts | 75 |
| Vanderbilt's #9 kaolin do | 25 |
| Dextrine do | .5 |
| Water (wet basis) do | 29.5 |
| Foam: | |
| Water cc | 200 |
| Saponin g | 6 |

Foam was added until the slip weighed 21 oz./500 cc. The slip was cast, the shapes dried, and then baked.

The brick or other shape made by any of these processes is strong, refractory, and possesses very good heat insulating properties. The bubble content of the brick may be varied from 40 to 90% by weight of the brick. The more bubbles the brick contains the higher, in general, is its insulating property and the lower its strength. The strength of the shape depends, of course, on the strength of both the bond and the bubbles. The greater strength of shapes made by the present invention as compared with those made by use of bubbles which contain little of other substances than alumina, employing the same bonding material and treatment, is due to the greater strength of the bubbles. The bubbles of the present invention have, in general, thicker side walls than do those composed of relatively pure alumina, and thus have greater resistance to breaking as a result of any kind of applied force.

The greater heat insulating property of the present refractory shape results from the relatively large percentage of substantially closed hollow globules, which entrap air, contained therein.

Having thus fully described the invention, it is desired to claim:

1. A refractory or insulating brick comprising alumina bubbles containing titania in an amount of the order of 1 to 1½%.

2. A refractory or insulating brick comprising alumina bubbles containing titania in an amount of the order of 1 to 1½%, 45% or over of the bubbles in the brick being substantially closed.

3. A refractory or insulating brick comprising alumina bubbles containing titania between 1.0 and 1.5%, and iron oxide and silica in small amounts less than 1%.

4. A refractory or insulating brick comprising alumina bubbles and a bonding material, the alumina bubbles containing titania between 1.0 and 1.5%, and composing from 40–90% of the weight of the brick.

5. A refractory or insulating brick comprising alumina bubbles of 8 mesh and finer and a bonding material, the alumina bubbles containing titania between 1.0 and 1.5%, and iron oxide and silica, and composing from 40–90% of the weight of the brick.

6. A refractory or insulating brick comprising thick-walled alumina bubbles containing titania in an amount of the order of 1 to 1½, and composing from 40–90% of the weight of the brick, from 45 to 70% of the bubbles being substantially closed.

7. A raw mix for the production of refractory or insulating shapes, comprising alumina bubbles containing titania in an amount of the order of 1 to 1½%, together with a clay bonding material.

8. A raw mix for the production of refractory or insulating shapes, comprising alumina bubbles containing titania between 1.0 and 1.5%, and iron oxide and silica in small amounts less than 1%, together with a clay bonding material.

9. A raw mix for the production of refractory or insulating shapes, comprising 8 mesh and finer alumina bubbles containing titania from 1.0 to 1.5%, iron oxide from 0.10 to 0.20%, and silica from 0.25 to 0.35%, together with a clay bonding material.

10. A raw mix for the production of refractory or insulating shapes, comprising alumina bubbles containing titania from 1.0 to 1.5%, and iron oxide and silica in small amounts less than 1%, together with a clay bonding material, the bubbles comprising from 40 to 90% of the dry weight of the mix.

11. As raw material for the manufacture of refractory or insulating shapes, a bubble containing a predominant amount of alumina, and titania from 1.0 to 1.5%.

12. As raw material for the manufacture of refractory or insulating shapes, a thick-walled bubble containing a predominant amount of alumina, titania from 1.0 to 1.5%, iron oxide from 0.10 to 0.20%, and silica from 0.25 to 0.35%.

13. As a new manufacture, alumina bubbles containing from about 1.0 to 1.5% titania.

14. As a new manufacture, bubbles composed principally of alumina containing from about 1.0 to 1.5% titania, and iron oxide and silica in small amounts less than 1%.

15. As a new manufacture, titania-containing alumina bubbles, a substantial proportion of which, in mass, have a central air space divided by at least one interior partition, and which have relatively thick side walls.

16. As a new manufacture, alumina bubbles as set forth in claim 15 which contain from about 1.0 to 1.5% titania.

JOHN CHARLES McMULLEN.